US007974335B2

(12) United States Patent
Park et al.

(10) Patent No.: US 7,974,335 B2
(45) Date of Patent: Jul. 5, 2011

(54) APPARATUS FOR EQUALIZING DECISION FEEDBACK BASED ON CHANNEL PROPERTIES CHANGE AND METHOD THEREFOR

(75) Inventors: Sung-Ik Park, Daejeon (KR); Seung-Won Kim, Fairfax, VA (US); Soo-In Lee, Daejeon (KR); Hyoung-Nam Kim, Busan (KR); You-Seok Lee, Busan (KR)

(73) Assignee: Electronics and Telecommunications Research Institute, Daejon (KR)

( * ) Notice: Subject to any disclaimer, the term of this patent is extended or adjusted under 35 U.S.C. 154(b) by 339 days.

(21) Appl. No.: 12/089,657

(22) PCT Filed: Dec. 26, 2005

(86) PCT No.: PCT/KR2005/004542
§ 371 (c)(1),
(2), (4) Date: Jan. 21, 2009

(87) PCT Pub. No.: WO2007/049841
PCT Pub. Date: May 3, 2007

(65) Prior Publication Data
US 2010/0074320 A1 Mar. 25, 2010

(30) Foreign Application Priority Data

Oct. 27, 2005 (KR) ........................ 10-2005-0101665

(51) Int. Cl.
*H03H 7/30* (2006.01)
*H03H 7/40* (2006.01)
*H03K 5/159* (2006.01)

(52) U.S. Cl. ........ 375/233; 375/143; 375/152; 375/341; 375/346; 375/350

(58) Field of Classification Search .......... 375/229–236, 375/346–350, 143, 152, 341
See application file for complete search history.

(56) References Cited

U.S. PATENT DOCUMENTS
4,833,693 A  5/1989  Eyuboglu
(Continued)

FOREIGN PATENT DOCUMENTS
KR  1020040022788  3/2004
(Continued)

OTHER PUBLICATIONS

R.Citta, et al; "A VSB DTV Receiver Designed for Indoor and Distributed Transmission Environment", Proceedings of the IEEE 52$^{nd}$ Annual Broadcast Symposium, pp. 1-11, Oct. 2002.
(Continued)

Primary Examiner — Curtis B Odom
(74) Attorney, Agent, or Firm — Ladas & Parry LLP (57) ABSTRACT

A decision feedback equalization apparatus includes a channel estimation unit estimating a channel on received signal based on the received signal and a training sequence; a channel matched filter maximizing SNR from the channel estimated by the channel estimation unit changing channel characteristics of the received signal; a noncausal filter approximating the changed channel; an equalizer input signal storage unit storing received symbols passed through the channel matched and the noncausal filters; a channel equalization unit performing a decision feedback equalization; a Trellis decoder detecting symbol from a channel-equalized signal; a mode selection unit selecting a specific mode; an error signal calculator comparing an output signal of the selected mode with an output signal of the channel equalization unit to calculate an error signal; and a tap coefficient updater updating tap coefficients to the channel equalization unit, an output signal from the storage unit, and an output signal from the Trellis decoder.

13 Claims, 6 Drawing Sheets

U.S. PATENT DOCUMENTS

| | | | |
|---|---|---|---|
| 4,914,699 A * | 4/1990 | Dunn et al. | 380/34 |
| 5,453,797 A * | 9/1995 | Nicolas et al. | 348/607 |
| 5,533,063 A | 7/1996 | Mitra et al. | |
| 2004/0091039 A1 | 5/2004 | Xia et al. | |
| 2005/0129143 A1 | 6/2005 | Kang et al. | |

FOREIGN PATENT DOCUMENTS

| | | |
|---|---|---|
| KR | 1020040025516 | 3/2004 |
| KR | 1020050001888 | 1/2005 |
| KR | 1020050049304 | 5/2005 |
| KR | 1020050054306 | 6/2005 |
| WO | 2005/050987 | 6/2005 |

OTHER PUBLICATIONS

Guozhu Long, et al; "The LMS Algorithm with Delayed Coefficient Adaptation", IEEE Transaction on Acoustics, Speech and Signal Processing, vol. 37, No. 9, pp. 1397-1405, Oct. 1989.

M. Vedat Eyuboğlu; "Detection of Coded Modulation Signals on Linear, Severely Distorted Channels Using Decision-Feedback Noise Prediction with Interleaving", IEEE Transaction on Communication, vol. 36, No. 4, pp. 401-409, Apr. 1998.

Hyoung-Nam Kim, et al; "Performance improvement of channel equalization in terrestrial DTV receivers using channel estimation", Signal Processing Symposium, vol. 16, No. 1, pp. 1-4, Sep. 2003.

* cited by examiner

TRANSMISSION SIGNAL = ( 1.0,  1.0,  1.0,  -3.0,  -5.0 )
INPUT SIGNAL OF CONVENTIONAL SYMBOL DETECTOR = ( 1.7,  -0.4,  2.5,  -1.8,  -5.2 )
OUTPUT SIGNAL OF CONVENTIONAL SYMBOL DETECTOR = ( 1.0,  -1.0,  3.0,  -1.0,  -5.0 )
OUTPUT SIGNAL OF TCM DECODER = ( 1.0,  1.0,  1.0,  -3.0,  -5.0 )

APPARATUS FOR EQUALIZING DECISION FEEDBACK BASED ON CHANNEL PROPERTIES CHANGE AND METHOD THEREFOR

TECHNICAL FIELD

The present invention relates to channel equalization techniques used in terrestrial digital broadcasting reception systems, and more particularly, to a decision feedback equalization apparatus and method capable of decreasing decision error. This is achieved by mildly changing channel characteristic of received signal distorted by poor channel using a channel matched filter, approximating channel characteristic changed by the channel matched filter from nonminimum phase channel to minimum phase channel using a noncausal filter, and adopting a trellis decoder whose Trace Back Depth (TBD) is 1 and degree of complexity is reduced as a symbol detector of the equalization apparatus.

BACKGROUND ART

In digital communication systems, since data is generally transmitted over a limited band, interference is occurred in adjacent symbols due to a time dispersion effect that allows pulse energy of symbols to be dispersed into adjacent symbol pulses. Besides, data transmitted is affected by a variety of channel distortions. This channel distortion phenomenon contains multi-path phenomenon, frequency offset, phase jitter and so on. These phenomenons cause InterSymbol Interference (ISI), implying that transmission symbols affect adjacent symbols in digital communication systems, which becomes a great obstacle in obtaining required data.

In order to decrease symbol errors caused by such ISI, a conventional receiver (for example, digital broadcasting receiver) employs a channel equalization apparatus.

In most communication channels, since distortion factors as mentioned above are variable, they adopt an adaptive equalizer which adaptively updates tap coefficients according to time.

Hereinafter, a description will be given on a configuration of a conventional channel equalizer with reference to FIG. 1.

Figure 1:
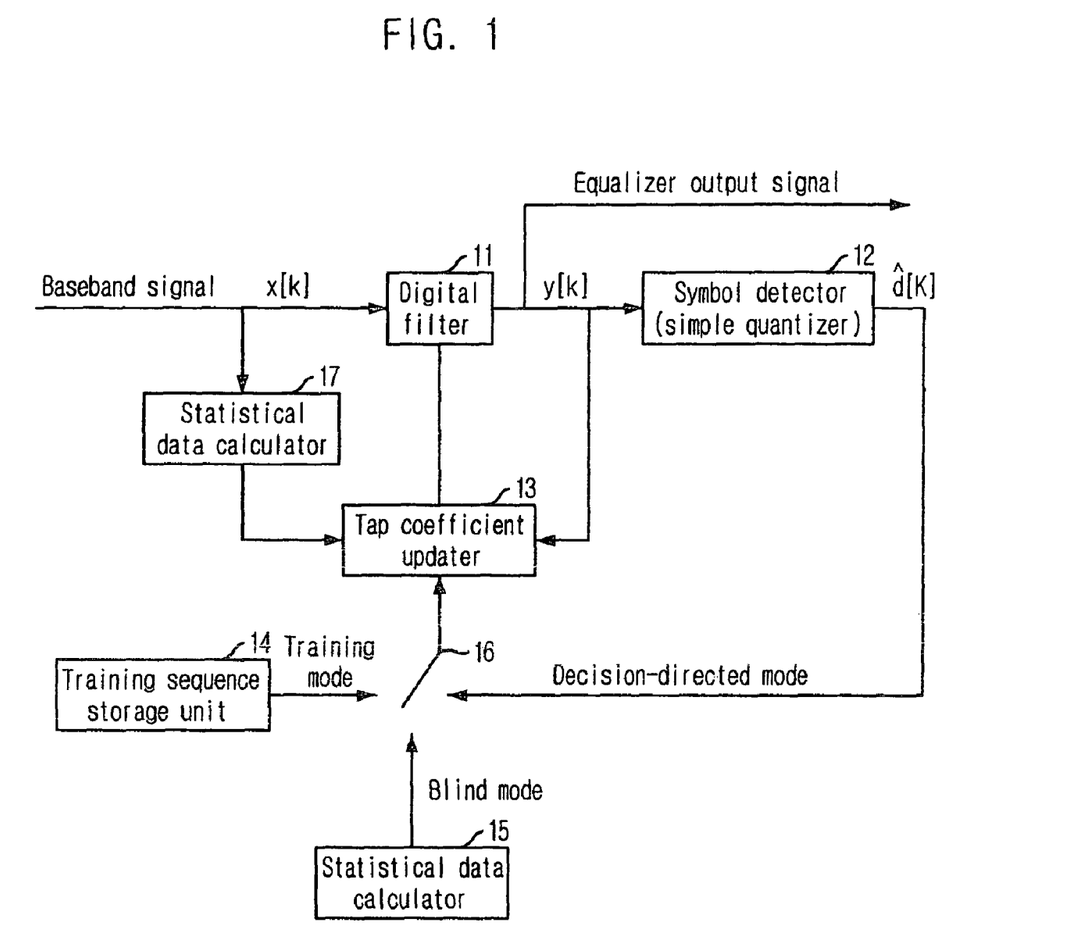
FIG. 1 illustrates a configuration of a general DFE device.

FIG. 1 illustrates a configuration of a general Decision Feedback Equalization (DFE) device.

As illustrated therein, in the general DFE device, a digital filter 11 removes ISI components that introduce distortions in a baseband signal received by a receiver (digital broadcasting receiver). At a symbol detector (simple quantizer) 12, a signal from the digital filter 11 is compared with a preset threshold to produce decision data.

Inputs to a tap coefficient updater 13 are an output signal of an equalizer input signal storage unit 17, an output signal of the digital filter 11, and error data selected by a switch 16, wherein an error is computed to update tap coefficients of the digital filter 11.

At a training sequence storage unit 14, a training data sequence that is also known by a transmitter (digital broadcasting transmitter) is stored therein. This training data sequence is read out in a training mode and provided to the tap coefficient updater 13.

At a statistical data calculator 15, a statistical error is calculated in a blind mode and forwarded to the tap coefficient updater 13.

At the switch 16, one of the outputs from the training sequence storage unit 14, the statistical data calculator 15 and the symbol detector 12 is selected in response to a selected mode and provided to the tap coefficient updater 13 as error data.

Then, at the tap coefficient updater 13, a corresponding error signal is derived; and then data corresponding to the tap coefficients of the digital filter 11 is read out from the equalizer input signal storage unit 17 to update the tap coefficients. The updated tap coefficients are then delivered to the digital filter 11.

As the channel equalization device, the DFE device is widely used in digital broadcasting receivers. Typically, the DFE device has a structure that an eye diagram of its output is open, which serves to precisely and easily do output signal decision as performance decision factor of the equalization device. Therefore, if an output of the symbol detector is a correctly decided symbol, a feedback filter has an advantage in that it does not involve any problem such as noise amplification phenomenon at output of the filter caused by a linear equalizer during the channel equalization while removing ISI by a previously decided symbol.

To make this merit of the DFE device useful, it is important not to raise decision error at an output of the symbol detector. Above all things, it is important to open the eye diagram of equalization device output.

For the above purpose, in Advanced Television System Committee (ATSC) digital broadcasting system that is American-type terrestrial TV standard, there is used a method that inserts one training sequence segment every 312 data segments to open the eye diagram of the equalization device output while suffering from reduction in data efficiency, wherein one segment is 208 bytes.

However, there exist many cases that it fails to open the eye diagram of the filter output since the inserted training sequence is short under a multi-path environment with a long ghost. Further, under a poor multi-path environment with insufficient tap coefficients of the filter in length for their convergence although the training sequence is existed, time-variable channel varied according to time, long ghost, or ghost with large signal level, there are many cases that it fails to open the eye diagram of the filter output. If the eye diagram is not open, there is a very high possibility that raises decision error in the symbol detector. This brings about an error propagation problem that allows error decision to be accumulated through the feedback loop of the DFE device.

Therefore, in order to make the tap coefficients of the filter converged or track time-variable channel properly, there is required a method of reducing decision error even during a data interval with no training sequence. In the absence of training sequence, an output of the symbol detector should be used in place of the training sequence. Thus, it needs to reduce total tap energy of feedback filter to minimize any effect by decision error of the symbol detector.

Most of conventional methods of decreasing such a decision error employ a Viterbi decoder with decoding delay. Typically, there is a method which gives a same delay as a decoding delay of the Viterbi decoder in an equalizer tap coefficient adjustor. This is disclosed in G. Long's proposal, entitled "The LMS Algorithm with Delayed Coefficient Adaptation", IEEE Trans. Acoust., Speech, Signal Processing, vol. ASSP-37, October 1989.

Another method solves the decoding delay of the Viterbi decoder by adding a periodical interleaver and deinterleaver thereto. This method is provided in M. V. Eyuboglu's proposal, entitled "Detection of Coded Modulation Signals on Linear, Severely Distorted Channels Using Decision-Feedback Noise Prediction with Interleaving", IEEE Trans.

Commu., vol. COM-36, pp. 401-409, April 1988. An additional method is disclosed in U.S. Pat. No. 4,833,693 issued to Eyuboglu.

The conventional methods of decreasing such a decision error as mentioned above adopt the Viterbi decoder with decoding delay value of (TBD-1) following the DFE device as the symbol detector thereof; and thus, they need additional devices to remove the decoding delay. Moreover, those methods require that TBD should be at least 5 times a value with one more than the number of memories of Trellis encoder used for a coding process for the Viterbi decoder following the equalization device to have a sufficiently good performance.

Normally, however, the decoding delay should be small maximally in order to use the output of the Viterbi decoder as feedback input of the DFE device.

Figure 5:
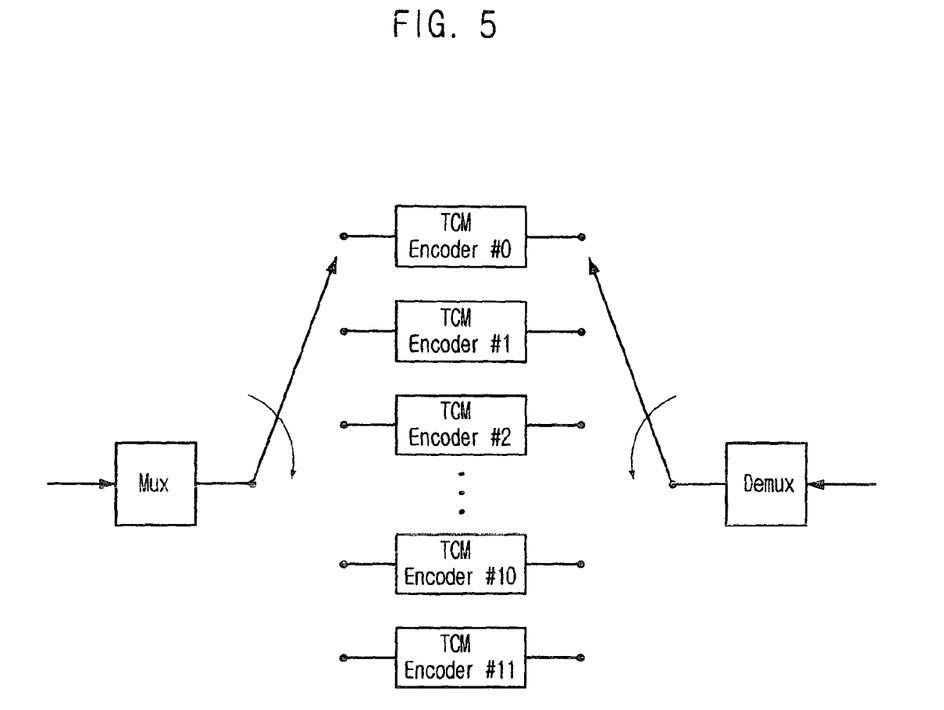
FIG. 5 is a view showing a configuration of a Trellis code interleaver used in an ATSC 8-VSB transmission system.

In particular, as shown in FIG. 5, the decoding delay value becomes 12× (TBD-1), rather than (TBD-1), in digital broadcasting systems adopting 12 Trellis Coded Modulation (TCM) encoders by Trellis code interleaver; and approximate decoding delay value becomes 168 because the number of memories of TCM encoder is 2. It is not very efficient to apply the Viterbi decoder with such a decoding delay value to actual systems.

Therefore, to use Viterbi decoder as the symbol detector of the DFE device in the digital broadcasting systems, the decoding delay should be small maximally, wherein it is of course the best to have no decoding delay.

Meanwhile, as existing methods of decreasing tap energy of the feedback filter, there are methods which increase tap number of feedforward filter that removes a post ghost, and change channel characteristic of received signal by making an antenna beam-forming or using a channel matched filter.

The method of increasing the tap number of the feedforward filter is known to be inefficient and performance improvement is lowered compared with an increased amount of tap number. Further, the method of changing the channel characteristic using the channel matched filter has relatively good performance compared with the method of increasing the tap number. This is disclosed in Richard Citta's suggestion, entitled "A VSB Receiver Designed for Indoor and Distributed Transmission Environments", IEEE 52$^{nd}$ Annual Broadcast Symposium, Oct. 9-11, 2002.

The channel equalization method suggested by Richard Citta has a very high degree of complexity since it provides a channel matched filter using over-sampled data and employs a fractionally-spaced equalization device. Furthermore, since such a method utilizes a simple quantizer (slicer) as a symbol detector, there may be occurred an error propagation problem by decision error.

To improve the Richard Citta's method, another method is issued for a method of using a channel matched filter and an equalization device of symbol unit with low degree of complexity and an implementation method of a symbol detector with small decision error. This method is proposed by Hyeung-Nam Kim, Seoung-Ik Park, Seung-Won Kim, entitled "Performance Improvement of Channel Equalization in Terrestrial DTV Receivers using Channel Estimation", Signal Processing Symposium, vol. 16, no. 1, pp. 176, September 2003.

This method improves stability of convergence but has a disadvantage in that the length of a pre ghost is long due to use of the channel matched filter, thereby causing a residual mean square error after convergence to be larger than a case with no channel matched filter rather.

Consequently, as one solution of the above problems, there has been a need for development of a filter capable of changing channel more mildly by changing a pre ghost to a post ghost.

DISCLOSURE

Technical Problem

It is, therefore, an object of the present invention to provide a decision feedback equalization apparatus and method capable of decreasing decision error. This is achieved by mildly changing channel characteristic of received signal distorted by poor channel using a channel matched filter, approximating channel characteristic changed by the channel matched filter from nonminimum phase channel to minimum phase channel using a noncausal filter, and adopting a Trellis decoder whose TBD is 1 and degree of complexity is reduced as a symbol detector of the equalization apparatus.

In other words, the present invention mildly changes channel characteristic of received signal distorted by poor channel using a channel matched filter, approximates the channel characteristic changed by the channel matched filter from nonminimum phase channel to minimum phase channel using a noncausal filter, and adopts a Trellis decoder whose TBD is 1 and degree of complexity is reduced as a symbol detector of the DFE apparatus. By doing so, the present invention can provide a novel DFE apparatus and method capable of decreasing decision error.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with one aspect of the present invention, there is provided a decision feedback equalization apparatus including: a channel estimation unit for estimating a channel on received signal based on the received signal and a training sequence; a channel matched filter for maximizing SNR from the channel estimated by the channel estimation unit to change channel characteristic of the received signal; a noncausal filter for approximating the channel changed by the channel matched filter from nonminimum phase channel to minimum phase channel; an equalizer input signal storage unit for storing received symbols passed through the channel matched filter and the noncausal filter; a channel equalization unit for performing a decision feedback equalization or channel equalization through filtering of a signal passed through the channel matched filter and the noncausal filter; a Trellis decoder for detecting symbol from a signal channel-equalized by the channel equalization unit; a mode selection unit for selecting a specific mode; an error signal calculator for comparing an output signal of the mode selected by the mode selection unit with an output signal of the channel equalization unit to calculate an error signal; and a tap coefficient updater for updating tap coefficients being applied to the channel equalization unit by using the error signal from the error signal calculator, an output signal from the equalizer input signal storage unit, and an output signal from the Trellis decoder.

In accordance with another aspect of the present invention, there is provided a decision feedback equalization method including the steps of: estimating a channel based on a received signal and a training sequence during a training sequence interval; performing channel matched-filtering of the received signal to change channel characteristic of the received signal to thereby maximize SNR from the estimated channel; conducting noncausal-filtering of the channel matched-filtered signal to approximate the channel characteristic from nonminimum phase channel to minimum phase channel; deciding values of parameters required for decision feedback of received symbol that is channel characteristic-changed, and initializing channel equalization parameters; detecting symbol or decision data from an output signal of equalizer that adopts the decided parameters by using a Trellis decoding algorithm whose TBD is 1 and degree of complexity is reduced; calculating statistical error data; selecting a specific mode; comparing an output signal of the selected mode with decision feedback equalization data to calculate an error signal; updating tap coefficients provided by the channel equalizing means by using the calculated error signal, an equalizer input signal, and the detected symbol or decision data; and performing channel equalization by using the updated tap coefficients.

As mentioned above, the present invention provides a decision feedback equalization apparatus and method having a channel matched filter, a noncausal filter, and a Trellis decoder in terrestrial digital broadcasting reception systems. Specifically, the present invention estimates a channel on received signal based on the received signal and a training sequence, provides a channel matched filter through the estimated channel information, and mildly changes channel characteristic of the poor received signal by using the channel matched filter. Thereafter, the present invention approximates the changed channel from nonminimum phase channel to minimum phase channel using the noncausal filter, and equalizes a signal passed through the channel matched filter and the noncausal filter by using a decision feedback equalizer having a Viterbi decoder with TBD of 1 and reduced degree of complexity. Through such a process, the present invention can efficiently perform channel equalization, even under a poor environment such as indoor reception and mobile reception.

More specifically, the present invention provides the channel matched filter and the noncausal filter unit that changes a pre ghost to a post ghost, created by the channel estimation unit of symbol unit, in front of the existing DFE apparatus. Based on this configuration, the present invention mildly changes channel characteristic of the received signal under a poor environment such as indoor reception and mobile reception, approximates the changed channel from nonminimum phase channel to minimum phase channel using the noncausal filter, and uses a Viterbi decoder (Trellis decoder) with TBD 1 and reduced degree of complexity, in place of the simple quantizer used as the symbol detector in the existing DFE device. By doing so, the present invention can improve a convergence speed of the digital filter unit (main filter unit) by reducing a decision error at output of the symbol detector (the Trellis decoder), and also decrease a residual MSE in steady-state after convergence.

Advantageous Effects

The present invention can decrease a decision error by mildly changing channel characteristic of a poor received signal using a channel matched filter, approximating the changed channel from nonminimum phase channel to minimum phase channel using the noncausal filter, and using a Viterbi decoder (Trellis decoder) with TBD 1 and reduced degree of complexity as a symbol detector in the DFE apparatus.

In other words, the present invention provides the channel matched filter and the noncausal filter unit created by the channel estimation unit of symbol unit, in front of the existing DFE apparatus. With this configuration, the present invention can mildly change channel characteristic of a received signal under a poor environment such as indoor reception and mobile reception; and decrease a residual MSE in steady-state after convergence by approximating nonminimum phase channel that bears a pre ghost to minimum phase channel. As a result, the present invention can improve a convergence speed and stability of the digital filter unit (main filter unit) and also decrease a residual MSE in steady-state after convergence by decreasing a decision error at output of the symbol detector (Trellis decoder) by using a Viterbi decoder (Trellis decoder) with TBD of 1 and reduced degree of complexity, instead of the simple quantizer used as the symbol detector in the existing DFE device.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description in association with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

In the following embodiments, a description will be provided as illustration on a case that the present invention is applied to an 8-Vestigial SideBand (VSB) system that is American-type terrestrial TV standard; but it should be noted that the present invention is not limited to such an illustration.

Figure 2:
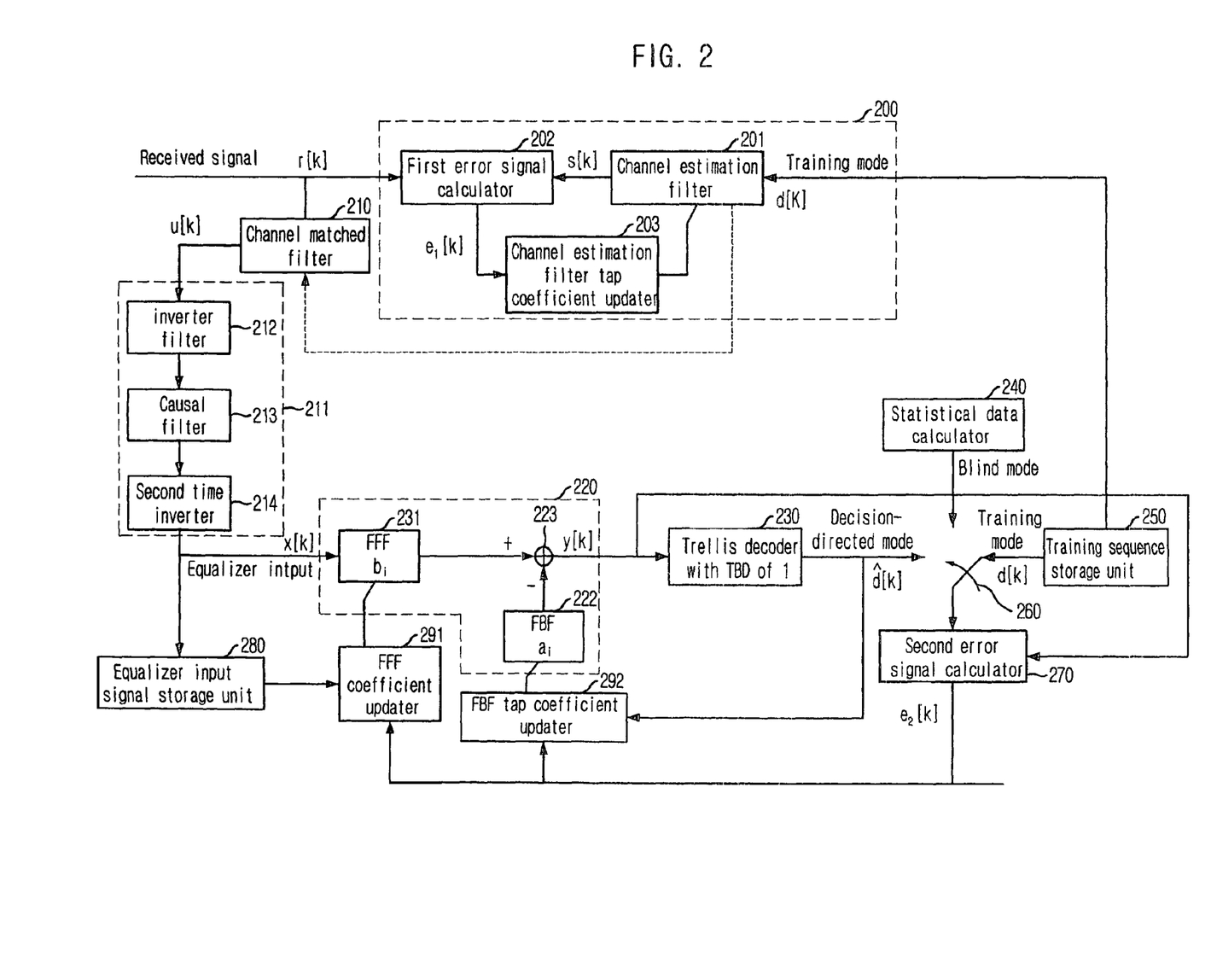
FIG. 2 is a block diagram illustrating a configuration of a DFE apparatus in accordance with an embodiment of the present invention.

FIG. 2 is a block diagram illustrating a configuration of a DFE apparatus in accordance with an embodiment of the present invention.

In order to help understand the present invention, a description will be given on a procedure of deriving an equation for calculation to update tap coefficients in a channel estimation unit 200 and a main filter unit 220, prior to describing a structure and an operation of a DFE apparatus provided with a channel matched filter 210, a noncausal filter unit 211 and a Trellis decoder 230 in a terrestrial digital broadcasting reception system.

First, input signals, reference signals and tap coefficients used in the channel estimation unit 200 and the main filter unit 220 are defined as follows.

$h_{C,i}$(i=0, 1, . . . , N−1) denotes tap coefficients of a channel estimation filter 201 contained in the channel estimation unit 200.

r[k] is a desired signal required for update of the tap coefficients of the channel estimation filter 201 at time k, that is, an input signal of the channel matched filter 210.

s[k] is an output signal of the channel estimation filter 201 at time k.

$h_{M,i}$(i=0, 1, . . . , N−1) indicates tap coefficients of the channel matched filter 210.

u[k] is an input signal of a noncausal filter unit 211 at time k, that is, an output signal of the channel matched filter 210.

$h_{A,i}$(i=0, 1, . . . , N−1) is tap coefficients of a causal filter 213 included in the noncausal filter unit 211.

x[k] is an input signal of the main filter unit 220 at time k, that is, an output signal of the noncausal filter unit 211.

y[k] is an output signal of the main filter unit 220 at time k.

$b_i$[k] is tap coefficients of a FeedForward Filter (FFF) 221 in the main filter unit 220 at time k.

$a_i$[k] is tap coefficients of a FeedBack Filter (FBF) 222 in the main filter unit 220 at time k.

A vector $\vec{h}_c$[k] composed of the tap coefficients of the channel estimation filter 201 becomes an estimation channel coefficient vector, wherein each component may be represented as:

$$h_{C,j} = \sum_{i=0}^{N-1} h_{C,i} \delta[i-j], j = 0, 1, \ldots, 1 \quad \text{Eq. (1)}$$

wherein N denotes a tap number of the channel estimation filter 201, $h_{C,i}$ is an ith tap coefficient of the channel estimation filter 201, and δ[i] is unit sample function. An output signal of the channel estimation filter 201 is calculated by using $\vec{h}_c$[k] as follows:

$$s[k] = \sum_{i=0}^{N-1} h_{C,i} \cdot d[k-i] \quad \text{Eq. (2)}$$

wherein d[k] is a training sequence stored in a training sequence storage unit 250.

An error signal for update of the tap coefficients of the channel estimation filter 201, $e_1$[k], is defined as:

$$e_1[k]=r[k]-s[k] \quad \text{Eq. (3)}$$

Through the above equations, at a channel estimation filter tap coefficient updater 203, the tap coefficients of the channel estimation filter 201 are updated during a training sequence interval by using $e_1$[k] as defined by Eq. (3) above.

Thereafter, the tap coefficients of the channel matched filter 210 are obtained with the tap coefficients of the cannel estimation filter 201 as follows:

$$h_{M,j} = \sum_{i=0}^{N-1} h^*_{C,N-1-i} \cdot \delta[i-j], j = 0, 1, \ldots, N-1 \quad \text{Eq. (4)}$$

wherein * is a complex conjugate and $h_{M,j}$ is a jth tap coefficient of the channel matched filter 210. As a result, the tap coefficients $h_M$ of the channel matched filter 210 are derived by symmetrizing the tap coefficient $h_C$ of the channel estimation filter 201 like mirror. Because of this process, the channel matched filter 210 is also named as channel mirror filter.

On the other hand, it is assumed that an impulse response vector, which is made by combining the channel matched filter 210 with a channel estimated by the channel estimation unit 200 at a time index k, is $\vec{h}$[k]. Under the assumption, if the largest coefficient value in the vector $\vec{h}$[k] is a Pth component $h_P$[k], the order of filter to be derived becomes P. At this time, a transfer function of the noncausal filter unit 211 is obtained by:

$$A(z) = \prod_{j=1}^{J} B_j(z) \quad \text{Eq. (5)}$$

wherein the impulse response A(z) of the noncausal filter unit 211 is repeatedly obtained; J is the number of repetition times; and $B_j$(z) denotes all pass filter, which is obtained by way of a procedure as follows.

Coefficients of $B_1$(z) may be computed based on $\vec{h}$[k], which is an impulse response of a combined system of the channel estimated by the channel estimation unit 200 and the channel matched filter 210. The coefficients are computed by the following:

$$B_1(z) = \frac{\xi_1 h_P^*[k] + \sum_{i=1}^{P} h_{P-i}^*[k] z^{-i}}{\sum_{i=0}^{P-1} h_i[k] z^{-i} + \xi_1 h_P[k] z^{-P}} \quad \text{Eq. (6)}$$

wherein $h_i$[k] indicates an ith component of $\vec{h}$[k] and a scale factor $\xi_1$ is multiplied by a value of $h_P$[k] to make a stable filter in which $B_1$(z) is operated at inverted time by allowing all poles of $B_1$(z) to be gone out to outside of unit circle. The scale factor $\xi_1$ is represented by:

$$\xi_1 = \begin{cases} 1, & m_2/m_1 \leq \tau \\ \dfrac{m_2}{rm_2}, & m_2/m_1 > \tau \end{cases} \quad \text{Eq. (7)}$$

wherein $m_1$ denotes a magnitude of $h_P$[k], $m_2$ represents a magnitude of a secondly large coefficient in $\vec{h}$[k], and τ stands for a threshold.

In Eq. (7) above, τ has a value of about 0.5.

If impulse response coefficients of changed channel, which is made by convolution of the noncausal filter unit 211 and $\vec{h}[k]$ that are obtained by Eqs. (6) and (7) above, are $g_1[i]$ ($i=-\infty, \ldots, L-1$), then a transfer function of the changed channel obtained through a single repetition is given by:

$$G_1(z) = \sum_{i=-\infty}^{L-1} g_1[i] z^{-i} \qquad \text{Eq. (8)}$$

wherein $g_1[i]$ can be easily obtained from a filter output that is derived by passing through $B_1^*(1/z^*)$ that is the noncausal filter 213 after time inversion of $h_i[k]$, and then turning back to an original forward time.

Using $g_1[i]$ obtained by Eq. (8) above, $B_2(z)$ that is the second section is derived by:

$$B_2(z) = \frac{\xi_2 g_1^*[0] + \sum_{i=1}^{\infty} g_1^*[-i] z^{-i}}{\sum_{i=-\infty}^{-1} g_1[i] z^{-i} + \xi_2 g_1[0]} \qquad \text{Eq. (9)}$$

where $\xi_2$ is obtained in the same manner as Eq. (7) above.

$B_j(z)$, which is a filter of a jth section, may be also obtained in the same way as follows:

$$B_j(z) = \frac{\xi_j g_{j-1}^*[0] + \sum_{i=1}^{\infty} g_{j-i}^*[-i] z^{-i}}{\sum_{i=-\infty}^{-1} g_{j-1}[i] z^{-i} + \xi_j g_{j-1}[0]} \qquad \text{Eq. (10)}$$

wherein, as can be seen from Eq. (10) above, $B_j(z)$ (j>1) has the order of infinity, but the order of multiplication $$\prod_{j=1}^{J} B_j(z)$$

of z-region of filters becomes P. Namely, $$A(z) = \prod_{j=1}^{J} B_j(z) = \sum_{i=0}^{P} h_{A,P-i}^* z^{-i}.$$

To perform noncausal filtering through the noncausal filter unit 211 so made, an input of the noncausal filter unit 211 is time-inverted and then causal-filtered as follows:

$$x_r[k] = \sum_{i=0}^{P} h_{A,i} u_r[k-i] \qquad \text{Eq. (11)}$$

wherein $u_r[k]$ is a signal that is obtained by time-inverting $u_r[k]$ that is an input signal of the noncausal filter unit 211 through a first time inverter 212, and $h_{A,i}$ is tap coefficient of $A^*(1/z^*)$ indicative of the causal filter 213 obtained from A(z) that is the noncausal filter. An equalizer input signal x[k] can be obtained by making $x_r[k]$ that is an output of the causal filter 213 passed through a second time inverter 214 and then by time-inverting it.

An output signal y[k] of the main filter unit 220 is derived by using the equalizer input signal x[k] as follows:

$$y[k] = \sum_{i=0}^{N_b-1} b_i[k] x[k-i] - \sum_{j=1}^{N_a} a_j[k] \hat{d}[k-j] \qquad \text{Eq. (12)}$$

where $N_b$ is a tap number of the FFF 221, $N_a$ is a tap number of the FBF 222, and $\hat{d}[k]$ is an output signal that is decided by comparing an output signal y[k] of the main filter unit 220 with a threshold predetermined by a simple quantizer (symbol detector) (12 of FIG. 1). An error signal for update of tap coefficients, $e_2[k]$, is represented by:

$$e_2[k] = \hat{d}[k] - y[k] \qquad \text{Eq. (13)}$$

If the error signal for update of tap coefficients is defined as Eq. (13) above, tap coefficient updating equations of the FFF 221 and the FBF 222 are as follows:

$$b_i[k+1] = b_i[k] + \mu e[k] x[k-i],$$

$$a_j[k+1] = a_j[k] - \mu e[k] \hat{d}[k-j] \qquad \text{Eq. (14)}$$

wherein μ denotes a step size, which is a value for deciding a convergence speed and Mean Square Error (MSE) in a steady state.

In other words, a residual MSE in the steady state becomes greater while the convergence speed becomes faster if the step size μ is great; but the residual MSE becomes smaller while the convergence speed becomes slower if it is small.

As described above, in the DFE apparatus, an eye diagram of its output is open, which serves to precisely and easily do output signal decision as performance decision factor of the equalization apparatus. Therefore, if an output $\hat{d}[k]$ of the symbol detector (simple quantizer) (12 of FIG. 1) is a correctly decided symbol, the feedback filter removes ISI by a previously decided symbol; and it appears in a linear equalizer that the noise amplification phenomenon caused during the channel equalization is not issued at output of the filter. Due to this characteristic, the DFE apparatus is widely utilized in the digital broadcasting system.

However, if any error exists in symbols decided by the symbol detector, stability is not guaranteed owing to its accumulation and propagation (error propagation) through the feedback loop while the error passes through the FBF.

Thus, the present invention makes the eye diagram opened by inserting, at certain periods, a training sequence promised in advance between a transmitter and a receiver, and then, uses the output $\hat{d}[k]$ of the symbol detector because symbols transmitted are not known during a data interval following the training sequence interval.

As mentioned above, the equalization in which the output of the symbol detector is used for update of the tap coefficients is called decision-directed channel equalization.

The present invention provides the channel matched filter 210 and the noncausal filter unit 211 created by the channel estimation unit 200 of symbol unit, in front of the DFE apparatus shown in FIG. 1. Specifically, the present invention mildly changes channel characteristic of a received signal in a poor environment such as indoor reception and mobile reception, approximates the changed channel from nonminimum phase channel to minimum phase channel using the noncausal filter, and uses a Viterbi decoder (Trellis decoder) 230 whose TBD is 1 and degree of complexity is reduced, rather than the simple quantizer used in the symbol detector of the DFE device shown in FIG. 1. By doing so, the present invention can improve a convergence speed of the main filter unit (digital filter) by reducing decision error at output of the Trellis decoder (symbol detector), and also decrease the residual MSE in the steady state after convergence.

As such, the DFE apparatus of the present invention having the channel matched filter 210, the noncausal filter unit 211 and the Trellis decoder 230 with TBD of 1 and reduced degree of complexity is applied to the 8-VSB system that is American-type terrestrial digital TV standard, thereby improving equalization performance by reducing decision error at the output of the symbol detector (Trellis decoder).

The 8-VSB system employs one segment as a training sequence among 313 segments; and has one dimensional constellation of which transmission symbols are 8-level signals of ±1, ±3, ±5, and ±7, differently from Quardrature Amplitude Modulation (QAM).

Hereinafter, there will be given details of the construction and operation of the inventive DFE apparatus having the channel matched filter 210, the noncausal filter unit 211 and the Trellis decoder 230 with TBD of 1 and reduced degree of complexity in the terrestrial digital broadcasting reception system.

As shown in FIG. 2, the DFE apparatus of the present invention includes the channel estimation unit 200 for estimating a channel on received signal of symbol unit from outside based on the received signal and a training sequence from the training sequence storage unit 250, the channel matched filter 210 for maximizing a Signal to Noise Ratio (SNR) from the channel estimated by the channel estimation unit 200 to change channel characteristic of the received signal, the noncausal filter unit 211 for approximating the channel changed by the channel matched filter 210 from nonminimum phase channel to minimum phase channel, the equalizer input signal storage unit 280 for storing a received symbol with any effect passed through channel changed through the channel matched filter 210 and the noncausal filter unit 211, the main filter unit 220 for performing a DFE (channel equalization) process through filtering of a signal passed through the channel matched filter 210 and the noncausal filter unit 211, and the Trellis decoder 230 for detecting a symbol (decision data) from the received symbol channel-equalized by the main filter unit 220 by using a Trellis decoding algorithm with TBD of 1 and reduced degree of complexity and outputting the symbol during a decision-directed mode. The inventive DFE apparatus further includes a statistics data calculator 240 for calculating and outputting statistical error data needed in a blind mode, the training sequence storage unit 250 for storing the training sequence, a switch 260 for selecting one of the inputs thereto in response to the training mode, the decision-directed mode, or the blind mode, a second error signal calculator 270 for comparing an output signal (decision data, statistical error data or training sequence data) of the mode selected by the switch 260 with an output signal (DFE data) of the main filter unit 220 to calculate an error signal, an FFF tap coefficient updater 291 for updating tap coefficients being applied to an FFF 221 contained in the main filter unit 220 based on the error signal from the second error signal calculator 270 and the output signal from the equalizer input signal storage unit 280, and an FBF tap coefficient updater 292 for updating tap coefficients being provided to an FBF 222 contained in the main filter unit 220 based on the error signal from the second error signal calculator 270 and the output signal from the Trellis decoder 230.

The channel estimation unit 200 is provided with the channel estimation filter 201, a first error signal calculator 202, and a channel estimation filter tap coefficient updater 203.

The noncausal filter unit 211 includes the first time inverter 212, the causal filter 213 and the second time inverter 214 to conduct a stable noncausal filtering.

The main filter unit 220 includes the FFF 211, the FBF 222, and an output subtracter 223.

Hereinafter, an operation of each component of the inventive DFE apparatus having the channel matched filter 210, the noncausal filter unit 211 and the Trellis decoder 230 as mentioned above will be described in detail.

At the channel estimation unit 200, a channel on received signal r[k] of symbol unit from outside is estimated based on the received signal r[k] and a training sequence d[k] from the training sequence storage unit 250 during a training sequence interval. To be more specific, at the first error signal calculator 202, an error signal $e_1[k]$ is calculated by using the training sequence d[k] and an output signal s[k] from the channel estimation filter 201. At the channel estimation filter tap coefficient updater 203, the tap coefficients $h_{C,i}$ being applied to the channel estimation filter 201 are updated depending on the error signal $e_1[k]$ calculated by the first error signal calculator 202. At this time, the channel estimation unit 200 provides the channel matched filter 210 to estimate a channel on the received signal of symbol unit by using the training sequence and the received signal for I number of fields or only in an initial start field, and maximize SNR from the estimated channel, I being equal to or larger than 1, the first segment being the training sequent segment and one field being composed of 313 segments in which one training sequence segment is inserted into every 312 data segments. The received signal is then passed through the provided channel matched filter 210, thus mildly changing channel characteristic of the received signal that is under the poor environment such as indoor reception and mobile reception.

In the meantime, at the channel matched filter 210, channel matched filter tap coefficients $h_{M,i}$ are created by using the channel estimation filter tap coefficients $h_{C,i}$ calculated by the channel estimation unit 200; and then SNR of the received signal is maximized based on the created channel matched filter tap coefficients $h_{M,i}$ and the received signal r[k].

At the noncausal filter unit 211, a pre ghost of the received signal, which is made by time-inverting an output signal of the channel matched filter 210, passing through the causal filter 213, time-inverting in a forward direction again, and passing through the channel matched filter 210, is all changed to a post ghost to approximate the channel characteristic from nonminimum phase channel to minimum phase channel. For this, the noncausal filter 211 is provided with the first time inverter 212 for storing the output signal of the channel matched filter 210 on a block basis and then time-inverting it, the causal filter 213 for filtering the signal time-inverted by the first time inverter 212 to be stable, and the second time inverter 214 for time-inverting a signal passed through the causal filter 213 again.

At the main filter unit 220, channel equalization is carried out through filtering of an output signal of the noncausal filter 211.

At the Trellis decoder 230, a symbol is detected from a digital broadcasting signal provided by the main filter unit 220 based on a Viterbi decoding algorithm (Trellis decoding algorithm) whose TBD is 1. That is, the Trellis decoder 230, as shown in FIG. 5, detects a symbol using the Viterbi decoding algorithm whose TBD is 1 and degree of complexity is reduced in the digital broadcasting system using 12 Trellis encoders (TCM encoders) by Trellis code interleaver, thus allowing a decoding delay value to be 0.

At the statistical data calculator 240, statistical data required in the blind mode is calculated and then forwarded to the switch 260.

At the training sequence storage unit 250, the training sequence used in the training mode or the channel estimation unit 200 is stored therein.

At the switch 260, one output is chosen in response to a selected one of the training mode, the decision-directed mode and the blind mode. In other words, the switch 260 selects the training sequence data from the training sequence storage unit 250 in the training mode, the decision data from the Trellis decoder 230 in the decision-directed mode, and the statistical error data from the statistics data calculator 240 in the blind mode.

At the second error signal calculator 270, an error signal $e_2[k]$ is calculated by comparing an output signal y[k] of the main filter unit 220 with an output signal $\hat{d}[k]$ of the Trellis decoder 230, an output signal of the statistical data calculator 240, or an output signal of the training sequence storage unit 250.

At the FFF tap coefficient updater 291, tap coefficients $b_i[k]$ being applied to the FFF 221 are updated based on the output signal from the equalizer input signal storage unit 280 and the error signal $e_2[k]$ calculated by the second error signal calculator 270.

At the FBF tap coefficient updater 292, tap coefficients $a_i[k]$ being provided to an FBF 222 are updated based on the output signal $\hat{d}[k]$ from the Trellis decoder 230 and the error signal $e_2[k]$ from the second error signal calculator 270.

Next, an operation of the Trellis decoder 230 that detects a symbol using the viterbi decoding algorithm (Trellis decoding algorithm) with TBD of 1 and reduced degree of complexity will be described in detail with reference to FIG. 3.

Figure 3:
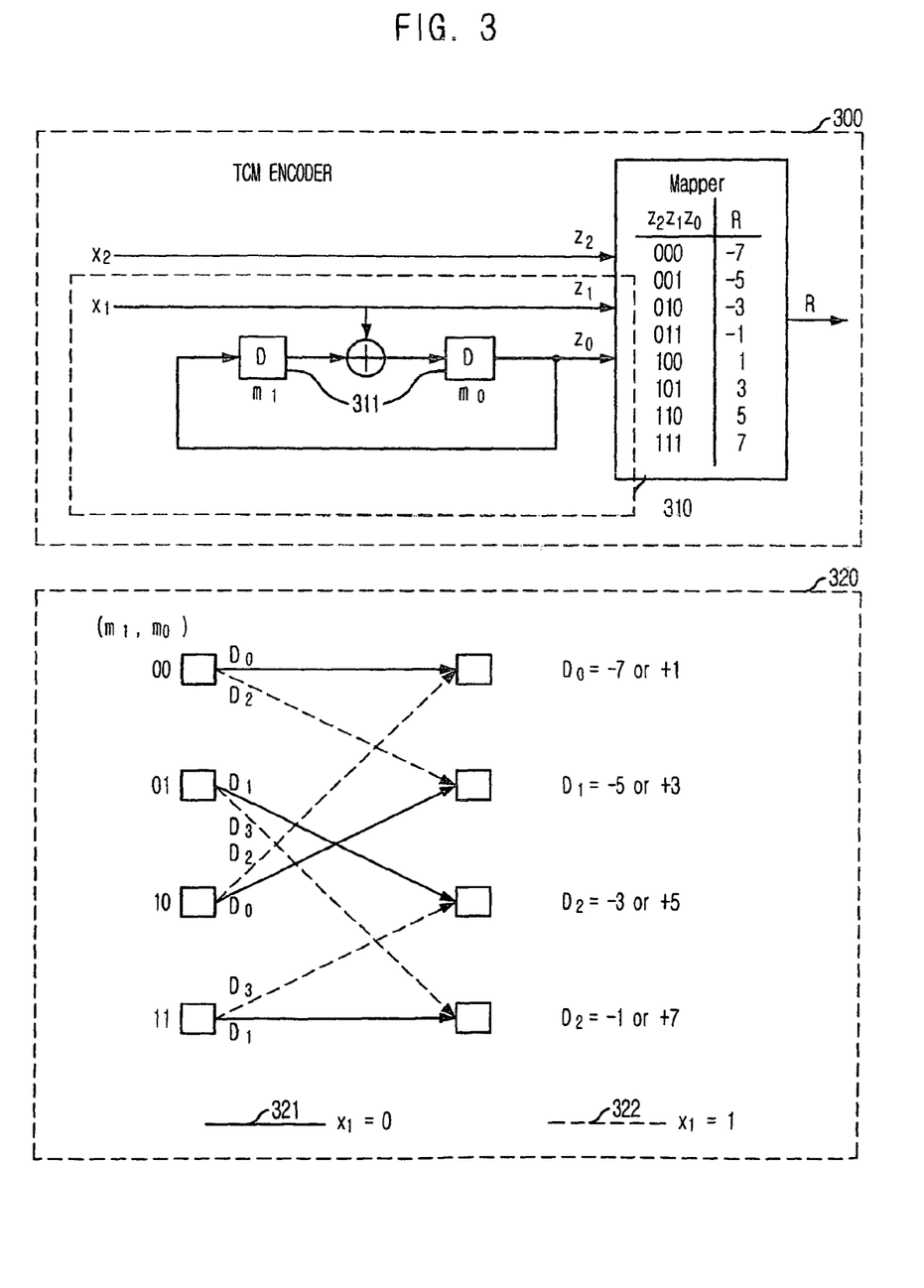
FIG. 3 is a view showing the Trellis encoder (TCM encoder in the digital broadcasting transmission system) used in an 8-VSB system being American-type terrestrial digital TV standard and a Trellis diagram.

FIG. 3 is a view showing the Trellis decoder 300 (TCM encoder in the digital broadcast system) used in the 8-VSB system being the American-type terrestrial digital TV standard and a Trellis diagram 320.

In the Trellis diagram 320 of FIG. 3, a solid-line 321 indicates a state transition of a memory 311 when an input $x_1$ of a convolution encoder 310 is 0; and a dotted-line 322 denotes a state transition of the memory 311 when the input $x_1$ of the convolution encoder 310 is 1.

By applying the Trellis encoder 300 (composed of two delays and one binary adder) of coding rate ⅔ in baseband, an output of 3-bit $(z_0, z_1, z_2)$ is obtained if its input is 2-bit $(x_1, x_2)$; and 8 information represented by 3-bit are set to correspond to symbols of {−7, −5, −3, −1, 1, 3, 5, 7}. A frequency spectrum to be transmitted is formed by making an output of a symbol mapper passed through a VSB modulator.

In the 8-VSB modulator, bits to be transmitted are lengthened from 2 bits to 3 bits by applying the coding rate ⅔ Trellis encoder 300 (TCM encoder of transmission system), thus providing output symbols with 8 constellations. Accordingly, an interval between adjacent symbol constellations becomes 2 and thus noise margin becomes smaller with respect to a same transmission power. But, a symbol error correction is conducted by operation of the Trellis encoder (transmitter TCM encoder) wherein a distance between output constellations is changed from Hamming distance to Euclidean distance. For the above reason, since a valid distance between symbols is increased, a more good performance can be accomplished in terms of Threshold Of Visibility (TOV), compared with a case of applying no TCM encoder.

It is first set that an initial state of a memory (delay) 311 of the TCM encoder 300 shown in FIG. 3 is "0($m_1=0$, $m_0=0$)", and its output signal (transmission signal) is (1.0, 1.0, 1.0, −3.0, −5.0). In addition, it is set that an output signal of the main filter unit 220, i.e., an input signal of the symbol detector (Trellis decoder) 230 is (1.7, −0.4, 2.5, −1.8, −5.2). Then, in the existing DFE apparatus of the digital broadcasting reception system (see FIG. 1), an output of the simple quantizer used as the symbol detector 12 becomes (1.0, −1.0, 3.0, −1.0, −5.0); and thus, errors are occurred in 3 symbols (−1.0, 3.0, −1.0).

By detecting symbols using the Trellis decoding algorithm whose TBD is 1 and degree of complexity is reduced, errors can be considerably decreased in the Trellis decoder (symbol detector) 230.

Figure 4:
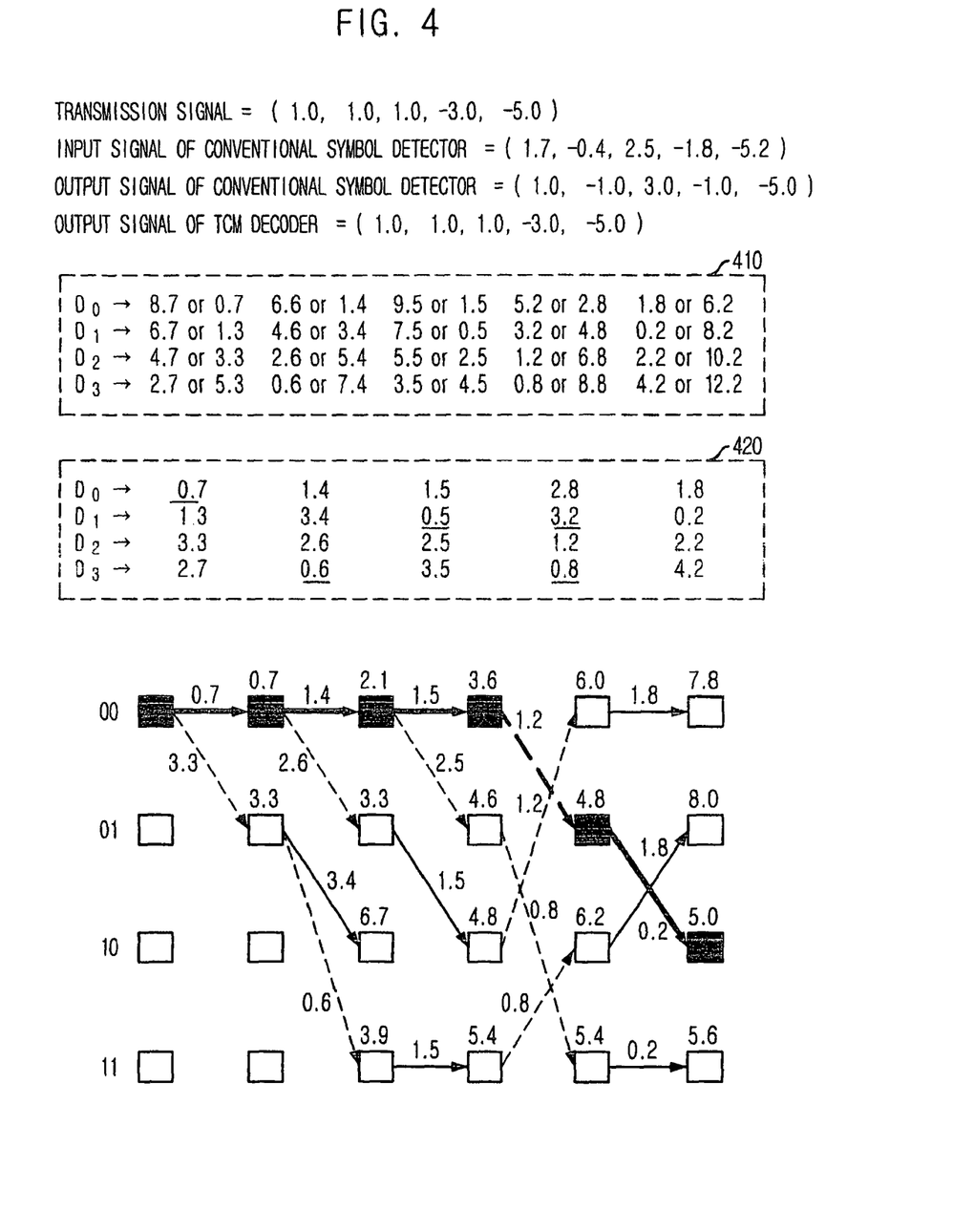
FIG. 4 is a view for describing a symbol detection process in the Trellis decoder whose TBD is 1 and degree of complexity is reduced in the DFE apparatus in accordance with an embodiment of the present invention.

FIG. 4 is a view for describing a symbol detection process in the Trellis decoder whose TBD is 1 and degree of complexity is reduced in the DFE apparatus in accordance with an embodiment of the present invention. That is, in FIG. 4, the Viterbi decoding algorithm is employed as one example of the Trellis decoding algorithm to detect symbols.

As shown therein, at the Trellis decoder 230, an absolute value 410 of distance between an input signal y[k] of the symbol detector and 4 symbol pairs [$D_0$(=−7 or +1), $D_1$(=−5 or +3), $D_2$(=−3 or +5), $D_3$(=−1 or +7)] appeared on the Trellis diagram 320 is calculated, unlike the existing Viterbi decoder, as follows:

Absolute value of distance=$|y[k]-D_i|$, i=1, 1, 2, 3      Eq. (15)

Subsequently, a smallest absolute value 420 of distance for each pair is selected among the calculated absolute value pairs of distances.

Next, a new accumulative absolute value of distance is computed by adding the calculated absolute value of distance to a previously calculated accumulative absolute value of distance every all states [0=(00), 1=(01), 2=(10), 3=(11)] appeared in the Trellis diagram 320 at time index k.

And then, the remaining accumulative absolute values, except for the smallest accumulative absolute value, are removed every all the states appeared in the Trellis diagram 320 at time index k.

Thereafter, a state with the smallest accumulative absolute value among all the states appeared on the Trellis diagram 320 at time index k is selected; and an output of symbol detector (Trellis decoder) 230 is obtained from a branch on the Trellis diagram transited to the selected state.

The above-described steps are repeatedly performed for every symbol time index k.

Through the above process, an output signal of the Trellis decoder 230 that detects symbols using the Viterbi decoding algorithm whose TBD is 1 and degree of complexity is reduced becomes (1.0, 1.0, 1.0, −3.0, −5.0), which is the same as the output signal of the Trellis encoder (TCM encoder in the digital broadcasting reception system) of FIG. 3, that is, the transmitted signal.

As described above, the DFE apparatus having the Trellis decoder 230 using the Viterbi decoder with TBD of 1 and reduced degree of complexity decreases decision errors at the output of the symbol detector (Trellis decoder), thereby improving the convergence speed and also reducing the residual MSE.

Figure 6:
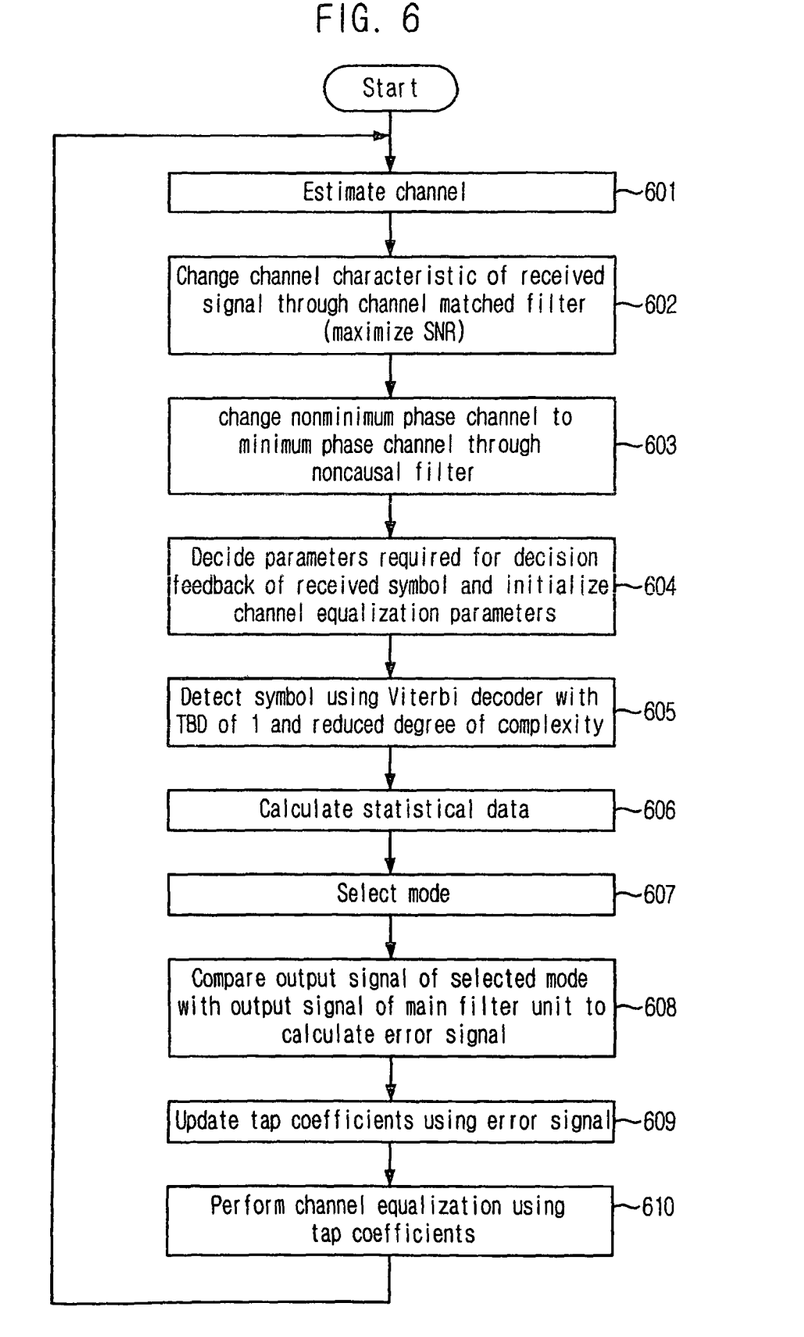
FIG. 6 is a flowchart illustrating a DFE method in accordance with an embodiment of the present invention.

FIG. 6 shows a flowchart for describing a DFE method in accordance with an embodiment of the present invention.

First, at step 601, a channel is estimated by using a received signal r[k] and a training sequence d[k] in the channel estimation unit 200 during a training sequence interval.

At a next step 602, the received signal r[k] is filtered from the estimated channel by the channel matched filter 210 to maximize SNR to thereby change channel characteristic.

That is, the channel matched filter 210 creates channel matched filter tap coefficients $h_{M,i}$ by using channel estimation filter tap coefficients $h_{C,i}$ calculated by the channel estimation unit 200 and then maximizes SNR of the received signal r[k] based on the created channel matched filter tap coefficients $h_{M,i}$ and the received signal r[k].

Thereafter, the signal from the channel matched filter 210 is passed through the noncausal filter unit 211 to approximate nonminimum phase channel to minimum phase channel at step 603 to thereby change the channel characteristic. Namely, the signal from the channel matched filter 210 is passed through the noncausal filter unit 211 to change a pre ghost to a post ghost. By doing so, the channel characteristic of the received signal over the channel under the poor environment such as indoor reception and mobile reception can be mildly changed and the residual MSE after convergence can be reduced.

Subsequently, values of parameters required for efficient decision feedback of the received symbol with changed channel characteristic are decided; and then other channel equalization parameters are initialized at step 604.

At a following step 605, symbols are detected from an output signal of the equalizer that adopts the decided parameters at specific time index by using the Trellis decoder 230 with TBD of 1 and reduced degree of complexity.

Next, statistics data required in the blind mode is calculated by the statistical data calculator 240 at step 606.

And then, one mode is selected among the training mode, the decision-directed mode and the blind mode through the switch 260 at step 607.

At this time, the second error signal calculator 270 calculates an error signal $e_2[k]$ by comparing an output signal of the selected mode (an output signal of the training sequence storage unit 250 in the training mode, an output signal d[k] of the Trellis decoder 230 in the decision-directed mode, or an output signal of the statistical data calculator 240 in the blind mode) with an output signal y[k] of the main filter unit 220 at step 608.

The error signal $e_2[k]$ so calculated is then delivered to the FFF tap coefficient updater 291 and the FBF tap coefficient updater 292 to be used in updating the tap coefficients $b_i[k]$, $a_i[k]$ at step 609. That is, the FFF tap coefficient updater 291 updates the tap coefficients $b_i[k]$ being applied to the FFF 221 based on the output signal from the equalizer input signal storage unit 280 and the error signal $e_2[k]$ from the second error signal calculator 270. And, the FBF tap coefficient updater 292 updates the tap coefficient $a_i[k]$ being provided to the FBF 222 based on the output signal â[k] from the Trellis decoder 230 and the error signal $e_2[k]$ from the second error signal calculator 270.

Thereafter, the channel equalization is performed by the main filter unit 220 by using the updated tap coefficients $b_i[k]$, $a_i[k]$ at step 610.

The above steps 601 to 610 are repeatedly carried out.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

While the present invention has been described with respect to certain preferred embodiments, it will be apparent to those skilled in the art that various changes and modifications may be made without departing from the scope of the invention as defined in the following claims.

What is claimed is:

1. A decision feedback equalization apparatus comprising:
    a channel estimating means for estimating a channel on received signal based on the received signal and a training sequence;
    a channel matched filtering means for maximizing a Signal to Noise Ratio (SNR) from the channel estimated by the channel estimating means to change channel characteristic of the received signal;
    a noncausal filtering means for approximating the channel changed by the channel matched filtering means from nonminimum phase channel to minimum phase channel;
    an equalizer input signal storing means for storing received symbols passed through the channel matched filtering means and the noncausal filtering means;
    a channel equalizing means for performing a decision feedback equalization (channel equalization) through filtering of a signal passed through the channel matched filtering means and the noncausal filtering means;
    a Trellis decoding means for detecting symbol from a signal channel-equalized by the channel equalizing means;
    a mode selecting means for selecting a specific mode;
    an error signal calculating means for comparing an output signal of the mode selected by the mode selecting means with an output signal of the channel equalizing means to calculate an error signal; and
    a tap coefficient updating means for updating tap coefficients being applied to the channel equalizing means by using the error signal from the error signal calculating means, an output signal from the equalizer input signal storing means, and an output signal from the Trellis decoding means.

2. The apparatus as recited in claim 1, wherein the channel matched filtering means creates channel matched filter tap coefficients based on channel estimation filter tap coefficients calculated by the channel estimating means, and maximizes SNR of the received signal based on the created channel matched filter tap coefficients and the received signal to thereby change channel characteristic of the received signal.

3. The apparatus as recited in claim 1, wherein the noncausal filtering means changes a pre ghost of the received signal to a post ghost to approximate the channel changed by the channel matched filtering means from nonminimum phase channel to minimum phase channel, the received signal being a signal that is obtained by time-inverting an output signal of the channel matched filtering means and making the signal pass through a causal filter; and then time-inverting the signal back in a forward direction and making the signal pass through the channel matched filtering means.

4. The apparatus as recited in claim 3, wherein the noncausal filtering means includes:
    a first time inverter for storing an output signal of the channel matched filtering means on a block basis and time-inverting the stored signal;
    the causal filter for filtering the signal time-inverted by the first time inverter; and
    a second time inverter for time-inverting a signal passed through the causal filter again.

5. The apparatus as recited in claim 3, wherein the Trellis decoding means detects a symbol from received symbols channel-equalized by the channel equalizing means depending on a Trellis decoding algorithm whose Trace Back Depth (TBD) is 1 and degree of complexity is reduced.

6. The apparatus as recited in claim 3, wherein the trellis decoding means repeatedly performs, for each symbol time index, the steps of calculating an absolute value of distance between an output signal of the channel equalizing means and pairs of symbols appeared on Trellis diagram; selecting a smallest absolute value of distance for each pair among the calculated absolute values of distances; summing up a previously calculated accumulative absolute value of distance and the calculated absolute value of distance for all states on the Trellis diagram at specific time index to calculate a new accumulative absolute value of distance; removing remaining accumulative absolute values of distances except for the smallest accumulative absolute value of distance for all the states on the Trellis diagram at the specific time index; selecting a state with the smallest accumulative absolute value of distance among all the states on the Trellis diagram at the specific time index; and acquiring a Trellis decoder output signal from a branch on the Trellis diagram transited to the selected state.

7. The apparatus as recited in claim 5, wherein the channel estimating means provides the matched filtering means that estimates a channel on the received signal of symbol unit by using the training sequence and the received signal every I number of fields or only in an initial start field, and maximizes SNR from the estimated channel, said I being equal to or larger than 1 and said I number fields being composed of 313 segments in which one training sequence segment is inserted into every 312 data segments.

8. The apparatus as recited in claim 5, wherein the tap updating means includes:
    a Feed Forward Filter (FFF) tap coefficient updater for updating tap coefficients being applied to an FFF contained in the channel equalizing means based on the error signal from the error signal calculating means and the output signal from the equalizer input signal storing means; and
    a FeedBack Filter (FBF) tap coefficient updater for updating tap coefficients being provided to an FBF contained in the channel equalizing means based on the error signal from the error signal calculating means and the output signal from the Trellis decoding means.

9. The apparatus as recited in claim 5, wherein the mode selecting means includes:
    a statistical data calculator for calculating statistical error data;
    a training sequence storing unit for storing the training sequence; and
    a switch for selecting the training sequence data from the training sequence storing unit in a training mode, decision data from the Trellis decoding means in a decision-directed mode, and the statistical error data from the statistical data calculator in a blind mode.

10. A decision feedback equalization method comprising the steps of:
    estimating a channel based on a received signal and a training sequence during a training sequence interval;
    performing channel matched-filtering of the received signal to change channel characteristic of the received signal to thereby maximize SNR from the estimated channel;
    conducting noncausal-filtering of the channel matched-filtered signal to approximate the channel characteristic from nonminimum phase channel to minimum phase channel;
    deciding values of parameters required for decision feedback of received symbol that is channel characteristic-changed, and initializing channel equalization parameters;
    detecting symbol or decision data from an output signal of equalizer that adopts the decided parameters by using a Trellis decoding algorithm whose Trace Back Depth (TBD) is 1 and degree of complexity is reduced;
    calculating statistical error data;
    selecting a specific mode;
    comparing an output signal of the selected mode with decision feedback equalization data to calculate an error signal;
    updating tap coefficients provided by the channel equalizing means by using the calculated error signal, an equalizer input signal, and the detected symbol or decision data; and
    performing channel equalization by using the updated tap coefficients.

11. The method as recited in claim 10, wherein the channel matched filtering step creates channel matched filter tap coefficients based on channel estimation filter tap coefficients calculated by the channel estimating step, and maximizes SNR of the received signal based on the created channel matched filter tap coefficients and the received signal to change channel characteristic of the received signal.

12. The method as recited in claim 10, wherein the noncausal filtering step changes a pre ghost of the received signal to a post ghost to approximate the change channel from nonminimum phase channel to minimum phase channel, the received signal being a signal that is obtained by time-inverting the channel matched filtered-signal and making the signal pass through a causal filter; and then time-inverting the signal back in a forward direction and performing the channel matched filtering of the signal.

13. The method as recited in claim 12, wherein the symbol detecting step includes the steps of:
    calculating an absolute value of distance between a Trellis decoder input signal (equalizer output signal) and pairs of symbols appeared on Trellis diagram;
    selecting a smallest absolute value of distance for each pair among the calculated absolute value of distances;
    summing up a previously calculated accumulative absolute value of distance and the calculated absolute value of distance for all states on the Trellis diagram at specific time index to calculate a new accumulative absolute value of distance;
    removing remaining accumulative absolute values of distances except for the smallest accumulative absolute value of distance for all the states on the Trellis diagram at the specific time index;
    selecting a state with the smallest accumulative absolute value of distance among all the states on the Trellis diagram at the specific time index, and acquiring a Trellis decoder output signal from a branch on the Trellis diagram transited to the selected state; and
    repeatedly performing said steps for each symbol time index.

* * * * *